United States Patent
Leusink et al.

(10) Patent No.: US 11,001,367 B2
(45) Date of Patent: May 11, 2021

(54) ROTORCRAFT TAIL BOOM, AND A ROTORCRAFT

(71) Applicant: AIRBUS HELICOPTERS, Marignane (FR)

(72) Inventors: Debbie Leusink, Aix en Provence (FR); David Alfano, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 539 days.

(21) Appl. No.: 15/318,536

(22) PCT Filed: Jun. 4, 2015

(86) PCT No.: PCT/EP2015/062519
§ 371 (c)(1),
(2) Date: Dec. 13, 2016

(87) PCT Pub. No.: WO2016/008639
PCT Pub. Date: Jan. 21, 2016

(65) Prior Publication Data
US 2017/0121010 A1 May 4, 2017

(30) Foreign Application Priority Data
Jul. 16, 2014 (FR) .................................. 1401589

(51) Int. Cl.
*B64C 5/06* (2006.01)
*B64C 23/00* (2006.01)
(Continued)

(52) U.S. Cl.
CPC .................. *B64C 5/06* (2013.01); *B64C 5/02* (2013.01); *B64C 23/00* (2013.01); *B64C 27/04* (2013.01); *B64C 27/06* (2013.01); *B64C 27/82* (2013.01)

(58) Field of Classification Search
CPC ......... B64C 27/82; B64C 27/06; B64C 27/04; B64C 2027/8272; B64C 5/02; B64C 5/06;
(Continued)

(56) References Cited

U.S. PATENT DOCUMENTS 3,419,232 A 12/1968 McStay et al.
3,544,047 A 12/1970 Gabriel
(Continued)

FOREIGN PATENT DOCUMENTS

EP 0524044 1/1993
EP 2690008 1/2014
(Continued)

OTHER PUBLICATIONS

International Search Report for PCT/EP2015/062519, English translation attached to original, Both completed by the European Patent Office dated Jul. 27, 2015, All together 7 Pages.
(Continued)

*Primary Examiner* — Richard R. Green
(74) *Attorney, Agent, or Firm* — Brooks Kushman P.C.

(57) ABSTRACT

A tail boom having a structure and a protuberance, the protuberance being secure with the structure. In each section of the tail boom, the protuberance extends in elevation over an extension height (Hext) and it extends laterally over an extension thickness (EPext), the extension height (Hext) lying in the range 0.05 times the maximum thickness (EPmax) of the structure, included, to 0.5 times the maximum thickness (EPmax), included, of the section, the extension thickness (EPext) lying in the range 0 to 0.4 times the maximum thickness (EPmax), included, of the section.

20 Claims, 3 Drawing Sheets

(51) Int. Cl.
*B64C 27/04* (2006.01)
*B64C 5/02* (2006.01)
*B64C 27/06* (2006.01)
*B64C 27/82* (2006.01)

(58) Field of Classification Search
CPC ......... B64C 23/00; B64C 23/06; B64C 1/009; B64C 2001/0045
See application file for complete search history.

(56) References Cited

U.S. PATENT DOCUMENTS

| | | | |
|---|---|---|---|
| 4,264,043 A * | 4/1981 | Walker | B64C 5/06 |
| | | | 102/384 |
| 4,708,305 A | 11/1987 | Kelley et al. | |
| 5,209,430 A | 5/1993 | Wilson et al. | |
| 5,240,205 A | 8/1993 | Allongue | |
| 6,352,220 B1 | 3/2002 | Banks et al. | |
| 8,074,920 B2 | 12/2011 | Mikulla | |
| 8,210,468 B2 * | 7/2012 | Desroche | B64C 27/04 |
| | | | 244/17.11 |
| 8,752,786 B2 * | 6/2014 | Sonneborn | B64C 27/82 |
| | | | 244/17.19 |
| 8,991,747 B2 * | 3/2015 | Desroche | B64C 27/04 |
| | | | 244/17.19 |
| 9,242,713 B2 * | 1/2016 | D'Alascio | B64C 1/0009 |
| 2002/0079405 A1 | 6/2002 | Layukallo | |
| 2005/0279879 A1 | 12/2005 | Desroche | |
| 2014/0131517 A1 * | 5/2014 | D'Alascio | B64C 1/0009 |
| | | | 244/130 |
| 2014/0166804 A1 | 6/2014 | Desroche | |

FOREIGN PATENT DOCUMENTS

| | | |
|---|---|---|
| RU | 2281227 | 8/2006 |
| WO | 2012039702 | 3/2012 |

OTHER PUBLICATIONS

Kelley et al. NASA Technical Paper 3233, Aug. 1992, "Two-dimensional aerodynamic characteristics of several polygon-shaped cross-sectional models applicable 20 to helicopter fuselages".

* cited by examiner

ROTORCRAFT TAIL BOOM, AND A ROTORCRAFT

CROSS REFERENCE TO RELATED APPLICATIONS

This application is the U.S. National Phase of PCT Appln. No. PCT/EP2015/062519 filed Jun. 4, 2015, which claims priority to French patent Appln. No. 14 01589 filed Jul. 16, 2014, the disclosures of which are incorporated in their entirety by reference herein.

BACKGROUND OF THE INVENTION (1) Field of the Invention

The present invention relates to a tail boom of a rotorcraft, and to a rotorcraft having such a tail boom.

(2) Description of Related Art

A rotorcraft conventionally comprises at least one rotor referred to as a "main" rotor. Such a main rotor serves in particular to provide the rotorcraft with at least part of its lift and possibly also with propulsion.

In addition, a rotorcraft may have at least one rotor referred to as a "secondary" rotor. Such a secondary rotor serves in particular to control the yaw movement of the rotorcraft.

Thus, the rotorcraft has a central airframe carrying a main rotor. The central airframe is then extended by a tail boom that runs longitudinally rewards from the aircraft in order to carry airfoils for providing the aircraft with stability, and also where appropriate a secondary rotor. More precisely, the tail boom carries a tail fin, with the secondary rotor being carried by the tail fin or else being arranged within the tail fin in the context of a Fenestron®. In this configuration, the secondary rotor is sometimes referred to more simply as a "tail" rotor, given its location.

Alternatively, the tail boom is provided with a device for controlling the yaw movement of the rotorcraft that does not include a tail rotor.

The tail boom thus extends longitudinally over a maximum length, substantially along an anteroposterior plane of symmetry of the rotorcraft.

Furthermore, the tail boom extends over a maximum height in an elevation direction, and more precisely downwards from a top portion facing the main rotor to a bottom portion facing the ground.

Finally, the tail boom extends laterally over a maximum thickness and tapering from a first flank towards a second flank.

Under such circumstances, the maximum length of the tail boom is generally greater than its maximum height and its maximum thickness. In addition, the maximum height of the tail boom is generally greater than its maximum thickness.

Consequently, the tail boom is sometimes considered as constituting a thick wing. The relative thickness of the tail boom is often large and greater than 0.2, where "relative thickness" corresponds to the quotient of the maximum thickness divided by the maximum height.

This relative thickness is large in order to impart mechanical strength to the tail boom and mode placement that is sufficient to carry the tail fin and the secondary rotor.

In addition, such a large relative thickness serves to reduce the drag of the tail boom when the rotorcraft is moving sideways.

A relative thickness that is large makes it possible to obtain a tail boom that presents a surface area that is large enough to give rise to advantageous bending stiffness without generating excessive drag while moving sideways.

Nevertheless, the air stream passing through the main rotor in flight can impact against the top portion of the tail boom. This air stream passing through the main rotor is referred to below more simply as the "air stream".

This top portion then comprises the leading edge of the tail boom relative to the air stream. Conversely, the trailing edge is present in the bottom portion. In other words, the leading edge of a profile of the tail boom presents the highest point of the profile in the elevation direction, and the trailing edge of the profile represents the lowest portion of the profile in the elevation direction.

Under such circumstances, the air stream impacts against the tail boom in particular during a stage of hovering flight or indeed during a stage of climbing flight.

Likewise, this air stream impacts against the tail boom during stages of flight at low speeds. During these stages, air speeds due to the aircraft moving are not sufficient to prevent the wash from the main rotor touching the tail boom.

This air stream thus impacts against the top portion of the tail boom and splits so as to flow round the tail boom in the form of two air streams. These two air streams may separate from the tail boom, in particular in the zone of the tail boom that presents the greatest thickness transversely relative to the flow direction. This separation gives rise to considerable wake being created.

Consequently, the tail boom generates a large amount of drag in the elevation direction, which drag is referred to below as "negative lift".

This negative lift tends to move the aircraft fuselage downwards, and is therefore penalizing. Specifically, this large amount of negative lift tends to reduce the climbing speed of the rotorcraft, and above all to reduce the payload of the rotorcraft.

Modifying an existing tail boom in order to remedy this problem can be difficult to do.

For example, where possible, any modification to an existing tail boom should not give rise to non-linear behavior in the movements of the rotorcraft. Any such modification should also avoid harming the quality of flight of the aircraft.

In addition, where possible, any modification to an existing tail boom should avoid generating extra drag in a lateral direction so as to avoid significantly degrading the behavior of the aircraft in sideways flight. Adding an outgrowth in elevation thus appears to be awkward.

Furthermore, any modification of a tail boom should avoid degrading its ability to carry heavy assemblies, and in particular a tail fin and a secondary rotor. Modifying a tail boom by adding orifices can then be problematic for the structural strength of the boom, and also for the associated mode placement.

Likewise, adding heavy surfaces can change the center of gravity of the aircraft.

A structural modification to a tail boom can also modify its dynamic behavior, running the risk of giving rise to vibratory problems or indeed to unwanted resonances.

Under such circumstances, minimizing the negative lift of a tail boom in an elevation direction can be found to be difficult, given the multiple constraints.

The technological background remote from the problem of the invention comprises documents seeking to obtain an anti-torque effect using a tail boom.

Document U.S. Pat. No. 8,074,920 describes a tail boom having reinforcement on its top portion. In addition, the tail boom carries wings on its bottom portion for directing the air stream laterally. Document U.S. Pat. No. 8,074,920 thus relates to a tail boom tending to oppose the torque induced on the fuselage of the rotorcraft by a main rotor.

Document EP 0 524 044 describes a tail boom incorporating an anti-torque device. The device has slots arranged in the tail boom and fed with fluid under pressure by a mechanical blower.

Likewise, Document U.S. Pat. No. 6,352,220 describes a tail boom defining an air passage.

Document U.S. Pat. No. 4,708,305 describes a tail boom having top and bottom deflector strakes for minimizing the dimensioning of conventional anti-torque members.

Furthermore, Document US 2014/0166804 describes two projections arranged on one flank of a tail boom in order to act on the lateral force generated by the tail boom.

Likewise, Document U.S. Pat. No. 5,209,430 presents a tail boom seeking to improve the yaw control of the aircraft. That boom is provided with a top deflector strake on the retreating-blade side of the aircraft where the retreating blade moves, and a bottom deflector strake on the advancing-blade side of the aircraft.

Specifically, a blade moving towards the front of the aircraft is said to be an "advancing" blade, whereas a blade moving in the opposite direction to the forward direction is said to be a "retreating" blade. During its rotation, each blade thus represents in succession an advancing blade and then a retreating blade.

The forward direction of the aircraft corresponds to the direction of advance of the aircraft. This direction of advance thus extends from the rear of the aircraft towards the nose of the aircraft.

Documents U.S. Pat. Nos. 4,708,305 and 5,209,430 thus seek to generate a lateral force, and not to deal with the negative lift from the tail boom in a direction in elevation.

Furthermore, another known document is NASA document TP3233 "Two-dimensional aerodynamic characteristics of several polygon-shaped cross-sectional models applicable to helicopter fuselages", H. L. Kelly, C. A. Crowelt, J. C. Wilson, 1992.

That document describes a variety of tail boom sections that have been tested in a wind tunnel in order to determine their downward drags and the forces that are generated sideways.

In addition, a tail boom may carry means for providing stability in pitching. For example, Document US 2005/0279879 describes such a tail boom.

Document RU 2 281 227 describes a tail boom having two blades for creating a sideways force.

Document WO 2012/039702 describes a fine streamlined tail boom having a flap for generating a sideways force.

In general manner, such a tail boom presenting a small thickness ratio tends to vibrate.

Furthermore, the height of such a tail boom may be greater than the height of a tail boom presenting a large thickness ratio. Under such circumstances, the tail boom can generate difficulties while the aircraft is moving sideways in translation.

Document US 2002/079405 is also known.

BRIEF SUMMARY OF THE INVENTION

An object of the present invention is thus to propose a tail boom seeking to possess aerodynamic characteristics that are improved compared with certain prior art tail booms, and in particular a tail boom tending to improve the performance of an aircraft during a stage of hovering flight or during a stage of climbing flight, by generating less negative lift. In addition, the invention also seeks to be suitable for being implemented on certain already-existing tail booms during a "retrofit" renovation stage.

According to the invention, a tail boom has an elongate structure extending in a longitudinal direction over a distance referred to as its "length" along an anteroposterior plane of symmetry of the elongate structure.

The tail boom also extends in elevation from a high portion including a leading edge facing a lift rotor of a rotorcraft towards a low portion facing the ground when the rotorcraft is standing on the ground. In particular, the elongate structure extends downwards from a top towards a bottom that includes a plane surface.

The tail boom includes at least one protuberance extending said bottom downwards in order to reduce the negative lift of the tail boom, each protuberance being secure with the structure of the tail boom and extending under that structure in the longitudinal direction, there being no passage for air between the protuberance and said structure, and at least one or indeed each section of the tail boom contained in a vertical plane orthogonal to the longitudinal direction presents:

a shape of the structure referred to as a "main" shape that extends in elevation downwards from the top to the bottom over a distance that reaches a maximum referred to as the "maximum height", and extending laterally from a second flank to a first flank over a distance that reaches a maximum referred to as the "maximum thickness"; and a shape of each protuberance referred to as an "extension" shape being contiguous with a bottom zone of the structure, the bottom zone extending upwards in elevation from the plane face over a height referred to as the "bottom" height that is less than 15% of the maximum height, the extension shape extending downwards in elevation over a distance reaching a maximum referred to as the "extension height" and laterally over a distance reaching a maximum referred to as the "extension thickness", the extension height lying in the range 0.05 times the maximum thickness included to 0.5 times the maximum thickness, included, of the section, the extension thickness lying in the range 0, excluded, to 0.4 times the maximum thickness, included, of the section.

The term "0.05 times the maximum thickness, included" and the term "0.5 times the maximum thickness, included" are used to mean that the maximum height may reach those products. Likewise, the extension thickness may be equal to 0.4 times the maximum thickness of a section. Conversely, the term "said extension thickness lying in the range 0, excluded" means that the extension thickness is not zero.

Each protuberance is secure with the structure in the sense that the protuberance is attached either to the structure or to a component portion of the structure.

For convenience, the structure is subdivided geometrically in elevation into a top zone and a bottom zone. The bottom zone extends in elevation over no more than 15% of the maximum height of the structure. The top zone extends in elevation over at least over 85% of the maximum height.

In this context, the term "top zone" designates the zone of a section embodying the high portion of the tail boom, and the term "bottom zone" designates the zone of a section embodying at least part of the low portion of the tail boom.

Each point said to be "top" point of the periphery of a top zone is above a point said to be a "bottom" point of the periphery of a bottom zone in an elevation direction parallel to the anteroposterior plane. A top point is then spaced apart from the corresponding bottom point by a height. The maximum height thus represents the greatest height of the section.

In general manner, the term "height" designates the dimension of a body in such a direction in elevation parallel to or coinciding with the anteroposterior plane.

Likewise, the tail boom extends on either side of the anteroposterior plane of its elongate structure, the anteroposterior plane lying between a first flank and a second flank of the tail boom.

Each point referred to as a "first" point of the periphery of the first flank is spaced apart from a point referred to as a "second" point of the periphery of the second flank in a transverse direction orthogonal to the anteroposterior plane by a thickness. The maximum thickness then constitutes the largest thickness of the section.

In general manner, the term "thickness" designates the dimension of a body in such a transverse direction orthogonal to the anteroposterior plane.

With this basic terminology established, a conventional tail boom tends to generate penalizing negative lift.

The invention proposes adding a protuberance having specific dimensions to such a tail boom. The protuberance locally extends the periphery of the bottom zone of the elongate structure downwards.

Surprisingly, each protuberance then serves to control effectively the air stream coming from a lift rotor and impacting against the tail boom. Each protuberance may in particular limit a phenomenon whereby the air stream moves from side to side downstream from the tail boom.

Each protuberance then tends to reduce the magnitude and the dimensions of the wake of the air stream downstream from the tail boom. The term "downstream" should be considered relative to the flow direction of the air stream coming from the lift rotor.

Under such circumstances, adding at least one protuberance of small dimensions downstream from the elongate structure of the tail boom reduces the negative lift of the tail boom. It should be observed that each protuberance therefore cannot be considered as being the same as a deflector strake tending to generate an anti-torque effect. In particular, each protuberance of the invention is located under the elongate structure, being contiguous with a bottom zone of the structure. Conversely, Document RU 2 281 227 describes, by way of example, two deflector strakes in the form of blades arranged respectively under a structure and against a flank of a structure in order to generate a lateral force. The protuberances of the invention are thus arranged in particular locations solely for the purpose of limiting the negative lift of the tail boom.

This beneficial effect is nevertheless not obvious. Each protuberance tends to add to the weight of the tail boom. Nevertheless, the small dimensions of such a protuberance limits the increase in weight. In addition, the benefits provided by the protuberance may tend to compensate for such an increase in weight.

Furthermore, adding a protuberance to the tail boom tends naturally to increase the drag of the tail boom during a stage of sideways flight, whereas on the contrary the elongate structure presents a form that seeks to minimize such drag. This added protuberance can then be considered at first sight as being penalizing. Nevertheless, the small dimensions of the protuberance tend to diminish such a negative impact.

Although prejudices tend to indicate that a protuberance should not be added, adding a protuberance having specific dimensions tends to present advantages that compensate for these drawbacks.

Furthermore, each protuberance may be added to an existing rotorcraft.

The tail boom may also include one or more of the following characteristics.

Thus, each section main shape may present a relative thickness greater than or equal to 0.5, said relative thickness being equal to the quotient of said maximum thickness divided by said maximum height.

In particular, this relative thickness may enable the tail boom to carry heavy assemblies. Furthermore, the vibration of such a structure may tend to be reduced.

Nevertheless, a tail boom having such dimensions may give rise to a large amount of negative lift during a stage of forward flight, for example. However, each protuberance tends to reduce this negative lift.

Adding at least one protuberance of the invention to a structure of large thickness then makes it possible to obtain in synergistic manner a tail boom that presents numerous advantages.

In a variant, at least one protuberance is secure with the structure, the structure and the protuberance forming parts of a common structural shell.

The term "shell" designates a mechanical part.

The protuberance is thus an integral portion of the tail boom structure obtained by conventional fabrication techniques, e.g. using a mold when making it out of composite material.

In another variant, at least one protuberance is fastened to the tail boom by conventional means, such as rivets or adhesive, for example.

In another variant, at least one protuberance is connected to the structure by a fastener system, said fastener system comprising elevation movement means for masking said protuberance on request inside said structure, in a "retracted" position, and for extending said protuberance on request outside said structure, in an "extended" position, said protuberance projecting from said structure over a height equal to said extension height when in said extended position.

The protuberance can then project outside the structure when having such a protuberance is advantageous. Conversely, the protuberance can be retracted inside the structure when such a protuberance might be penalizing.

It can be understood that the term "no air passage lying between the protuberance and the structure" means that the air stream coming from the rotor cannot flow between the protuberance and the structure, in particular when the protuberance is in the extended position.

The fastener system may include a processor unit connected to a measurement system for determining a stage of flight, the processor unit executing instructions stored in a non-volatile memory for automatically positioning the protuberance in the retracted position when on the ground and during a stage of sideways flight.

The fastener system may then include at least one movement means for moving the protuberance. The movement means may include at least one drive member, such as an electric motor or an actuator, for example.

The processor unit may include a processor or equivalent means connected to the measurement system and to the movement means. The processor unit then generates an order, which is given to the movement means in order to move the protuberance into the stored position corresponding to the current stage of flight.

Deciding to issue an order to extend at least one protuberance may be determined on the basis of physical information of various kinds.

Thus, such a measurement system may include an air stream system enabling to determine the speed of the aircraft, and a control system connected to the flight controls, such as a system known as an aircraft flight control system (AFCS).

In alternative or additional manner, the fastener system may include control means for causing the protuberance to be moved under manual control.

A pilot can then cause the protuberance to be moved, where necessary.

Furthermore, at least one protuberance may present the form of a Gaussian curve in each section.

Alternatively, the protuberance may present the form of a sinusoid, of a triangle, or of a rectangle in each section. In the context of a rectangle, the corners of the protuberance may possibly be rounded.

Furthermore, the extension height of at least one protuberance may optionally be constant all along the length of said structure.

Furthermore, all of the sections of the protuberance may be identical, for example.

The extension height of said protuberance may conversely vary along the length of said structure.

This characteristic may limit the height of the protuberance at at least one point, so as to limit the sideways drag of the tail boom during flight in sideways translation.

By way of example, the sections of the protuberance may present dimensions that vary with a coefficient of proportionality.

The variation in height may be achieved by applying a varying proportionality coefficient so as to give the protuberance a form that is triangular or sinusoidal, when seen from the side.

In addition, the bottom of the bottom zone includes a plane surface, the protuberance extending in elevation from said plane surface.

Such a bottom presents the advantage of optimizing the aerodynamic characteristics of the tail boom.

Furthermore, the tail boom may have two protuberances that are offset laterally. Each protuberance may then have an "external" surface extending one of the flanks of the structure and an "internal" surface that is connected to said plane surface.

Each protuberance is then placed in optimized manner for minimizing the negative lift generated by the tail boom.

Optionally, the tail boom includes two protuberances, the protuberances being arranged laterally facing each other and on either side of said anteroposterior plane.

In addition to the tail boom, the invention provides an aircraft having a central airframe carrying at least one lift rotor with a plurality of blades, the central airframe being extended by a tail boom running along an anteroposterior plane of symmetry of a structure of the tail boom or of the central airframe. The tail boom is then of the above-described type.

Furthermore, when the tail boom has a single protuberance, the anteroposterior plane lying transversely between a first side and a second side of the aircraft, each blade being in an "advancing" blade position when the blade is moving on the first side and being in a "retreating" blade position when the blade is moving on the second side, the protuberance may be situated on the first side.

The protuberance is then advantageously arranged on the side of the aircraft where disturbances appear on an aircraft that does not have the invention.

Likewise, the anteroposterior plane lying transversely between a first side and a second side of the aircraft, each blade being in an "advancing" blade position when said blade is moving on the first side and being in a "retreating" blade position when said blade is moving on the second side, for each section said protuberance is arranged on either side of a plane of symmetry in elevation, a tangential plane being tangential to said structure on the first side, the tangential plane and the plane in elevation and the anteroposterior plane being parallel with each other, the plane in elevation is spaced apart transversely from the tangential plane by a spacing distance lying in the range 0.15 times the maximum thickness of the section, included, to 0.85 times the maximum thickness of the section, included.

This lateral location may vary along the length of the boom, and may vary from one protuberance to another in the context of a tail boom having a plurality of protuberances.

The term "0.15 times the maximum thickness of the section, included" and the term "0.85 times the maximum thickness of the section, included" mean that the spacing distance may reach either of those products.

BRIEF DESCRIPTION OF THE SEVERAL VIEWS OF THE DRAWINGS

The invention and its advantages appear in greater detail from the context of the following description of examples given by way of illustrating and with reference to the accompanying figures, in which.

DETAILED DESCRIPTION OF THE INVENTION

Elements present in more than one of the figures are given the seam references in each of them.

It should be observed that three mutually orthogonal directions X, Y, and Z are shown in some of the figures.

The first direction X is said to be longitudinal. The term "longitudinal" relates to any direction parallel to the first direction X.

The second direction Y is said to be transverse. The terms "transverse" and "lateral" relate to any direction parallel to the second direction Y.

Finally, the third direction Z is said to be in elevation. The term "in elevation" relates to any direction parallel to the third direction Z.

The plane defined by the first direction X and the third direction Z is an anteroposterior plane of symmetry in elevation of some of the members described.

The plane defined by the second direction Y and the third direction Z is a transverse vertical plane orthogonal to the first direction X.

Figure 1:
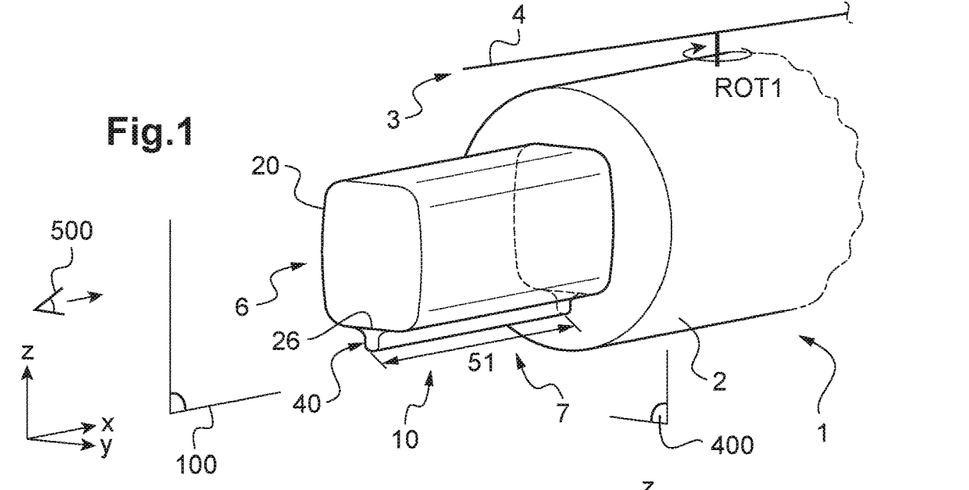
FIG. 1 is a diagrammatic view of an aircraft of the invention having a tail boom including a protuberance.

FIG. 1 shows an aircraft 1 of the invention.

The aircraft comprises a central airframe 2. The central airframe 2 carries a lift rotor 3 provided with a plurality of blades 4. The aircraft is thus a rotorcraft.

Furthermore, the aircraft 1 has a tail boom 10 provided with an elongate structure extending longitudinally from the central airframe 2 along anteroposterior plane 100. The tail boom 10 optionally includes a tubular structure.

The anteroposterior plane is a plane of symmetry in elevation of the elongate structure and of the central airframe.

This anteroposterior plane 100 lies between a first side 6 and a second side 7 of the aircraft 1. When the blades 4 are in an advancing blade position, the blades are moving on the first side 6. Conversely, when the blades 4 are in a retreating blade position, the blades are moving on the second side 7.

It should be recalled that a blade moving in the forward direction towards the front of the aircraft is said to be an "advancing" blade, whereas a blade moving in the direction opposite to the forward direction is said to be a "retreating" blade. The forward direction of the aircraft goes from the tail boom towards the central airframe in a longitudinal direction.

Consequently, and in the example shown, if the lift rotor 3 rotates in the clockwise direction ROT1, the first side 6 corresponds to the left side of the aircraft for an observer 500 observing the aircraft from the rear towards the front of the aircraft.

The tail boom 10 then comprises a structure 20. The structure 20 extends longitudinally in a longitudinal direction X along the anteroposterior plane 100 from the central airframe 2 over a length 51.

Furthermore, the tail boom has at least one protuberance 40 for reducing the negative lift of the tail boom.

Each protuberance 40 thus extends the structure 20 downwards. In other words, the protuberance 40 is connected to the structure 20, being arranged under the structure 20. Each protuberance may be hollow, comprising a wall defining a hollow enclosure.

The protuberance 40 presents dimensions that are smaller than the dimensions of the structure 20. Furthermore, the protuberance 40 is contiguous with the structure 20 so that there is no passage for air between the structure 20 and the protuberance 40.

The protuberance shown diagrammatically thus runs under the entire length 51 of the structure 20.

Nevertheless, the protuberance could run over only part of the structure 20.

In addition, FIGS. 1 to 10 show a single protuberance. Nevertheless, and with reference to FIG. 11, the tail boom could present a plurality of protuberances, e.g. two protuberances arranged laterally one beside the other.

Figures 2, 6:
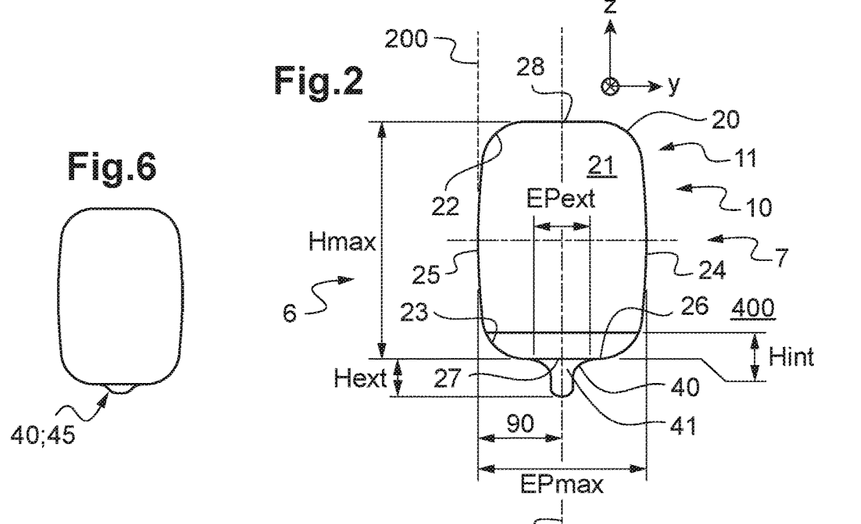
FIG. 2 is a section of the tail boom.
FIGS. 3, 4, 5, and 6 are diagrams showing various profiles for a protuberance.

FIG. 2 shows a section 11 of the tail boom. Each section 11 of the tail boom is then contained in a vertical plane 400 orthogonal to the longitudinal direction X, and to the anteroposterior plane 100.

Each section 11 of the tail boom may be subdivided into a main shape 21 of the tail boom together with an extension shape 41 of the protuberance 40.

Under such circumstances, the main shape 21 extends in elevation downwards from a top 28 of a top zone 22 towards a bottom 27 of a bottom zone 23. The main shape also extends laterally from a first flank 25 to a second flank 24.

The height between two points of the periphery of the tail boom in a plane parallel to the anteroposterior plane varies between a minimum, and a maximum referred to as the maximum height "Hmax". In the example shown, the maximum height Hmax is to be found in the anteroposterior plane.

Under such circumstances, the bottom zone extends in elevation upwards from a plane face 26 of the bottom over a height referred to as the bottom height "Hinf" that is less than 15% of the maximum height Hmax.

The distance between two points of the periphery of the tail boom in a plane orthogonal to the anteroposterior plane and to the section plane varies between a minimum, and a maximum referred to as the maximum thickness "EPmax". In the example shown, the maximum thickness EPmax is reached at the middle junction between the top zone and the bottom zone.

Under such circumstances, the tail boom preferably presents relative thickness that is greater than or equal to 0.5, where relative thickness is equal to the quotient of the maximum thickness EPmax divided by the maximum height Hmax.

In addition, and independently of the number of protuberances, the extension shape 41 of a protuberance is contiguous with the bottom zone 23.

This extension shape 41 extends downwards in elevation from a surface 26 of the bottom zone 23. For example, such a surface is a plane surface 26.

The height between a point of said surface and a point of the periphery of a protuberance in a plane parallel to the anteroposterior plane varies between a minimum, and a maximum referred to as the extension height "Hext". In the example shown, the extension height Hext is reached in the anteroposterior plane.

This extension height Hext then lies in the range 0.05 times the maximum thickness EPmax included of a section to 0.5 times the maximum thickness EPmax included of the same section in compliance with the following relationship:

$$0.05*EPmax \leq Hext \leq 0.5*EPmax$$

where "*" represents the multiplication sign.

The extension height Hext advantageously lies in the range 0.05 times the maximum thickness EPmax included to 0.1 times the maximum thickness EPmax.

The distance between two points of the periphery of a protuberance in a plane orthogonal to the anteroposterior plane and to the section plane varies between a minimum, and a maximum referred to as the extension thickness "EPext". In the example shown, the maximum thickness EPmax is reached at the junction between the protuberance 40 and the structure 20.

This extension thickness EPext then lies in the range 0 to 0.4 times the maximum thickness EPmax, included, of the section in compliance with the following relationship:

$$0 < EPext \leq 0.4*EPmax$$

where "*" represents the multiplication sign.

Furthermore, a protuberance 40 may be arranged on the first side 6 of the aircraft on which the advancing blades move.

In another variant, a protuberance is positioned transversely relative to a tangential plane 200. The tangential plane 200 is tangential to the structure 20 on the first side 6, the tangential plane 200 also being parallel to the anteroposterior plane 100.

Furthermore, a plane of symmetry 300 in elevation of a protuberance is parallel to the tangential plane 200 and to the anteroposterior plane 100.

Under such circumstances, the plane 300 in elevation is spaced apart transversely from the tangential plane 200 by a spacing distance 90 lying in the range 0.15 times the maximum thickness EPmax of the section, included, to 0.85 times the maximum thickness EPmax of the section, included, i.e.:

$$0.15*EPmax \leq \text{spacing distance} \leq 0.85*EPmax$$

where "*" represents the multiplication sign.

Figure 3:
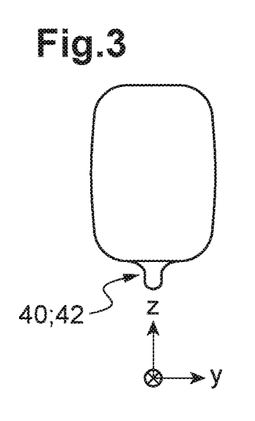

Furthermore, and with reference to FIG. 3, in each section a protuberance 40 may present the form of a Gaussian curve 42. In other words, a skin of the protuberance describes a Gaussian curve.

Figure 4:
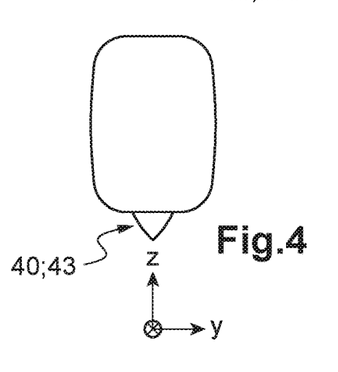

With reference to FIG. 4, in each section, a protuberance 40 may have the form of a triangle 43.

Figure 5:
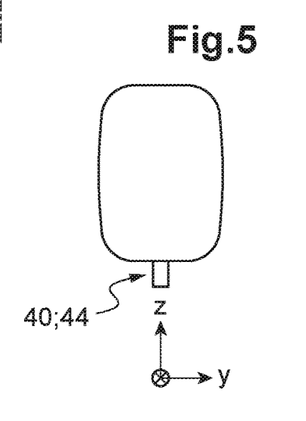

With reference to FIG. 5, in each section, a protuberance 40 may have the form of a rectangle 44.

With reference to FIG. 6, in each section, a protuberance 40 may have the form of a sinusoid 45.

Figure 7:
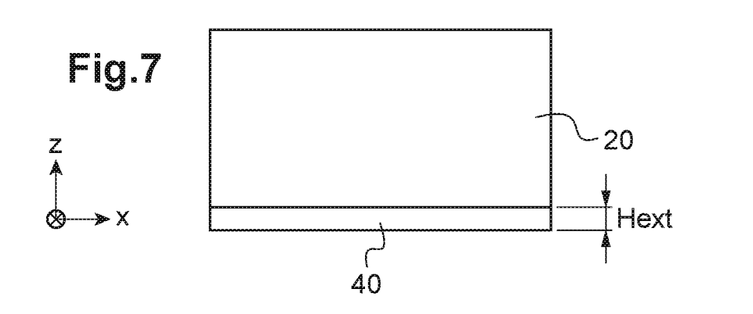
FIGS. 7, 8, and 9 are diagrams showing protuberances presenting various heights.

In a first embodiment and with reference to FIG. 7, the extension height Hext of a protuberance 40 is constant all along the length of said structure 20.

All of the sections of the protuberance are then identical, for example.

Figure 8:
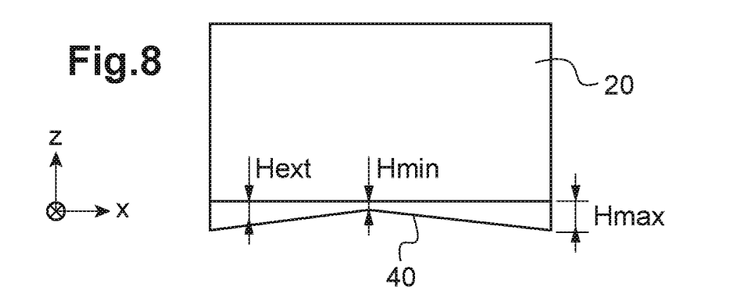
Figure 9:
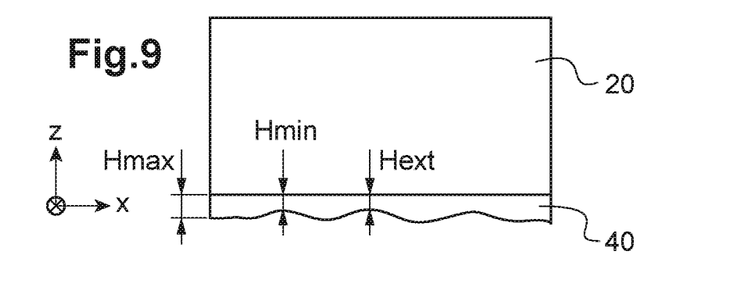

In a second embodiment, and with reference to FIGS. 8 and 9, the extension height Hext of a protuberance 40 may vary along the length of the structure.

In FIG. 8, the extension height Hext decreases linearly from a maximum Hmax to a minimum Hmin and then increases linearly to the maximum Hmax.

Such a relationship gives the protuberance the form of a triangle when seen from the side of the aircraft.

In FIG. 9, the extension height Hext varies with a sinusoidal relationship.

In this second embodiment, two adjacent sections may have dimensions that are proportional, or even homothetic, for example.

Furthermore, a protuberance 40 may be a component part of the structure 20. Nevertheless, the protuberance 40 may be a separate strip that is fastened against a surface of the structure 20.

Figure 10:
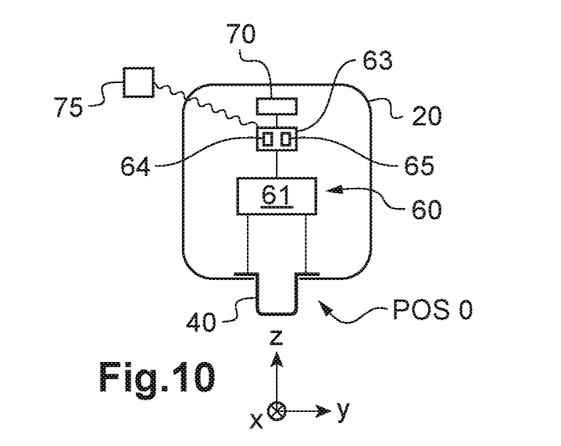
FIG. 10 is a diagram showing a fastener system provided with movement means.

With reference to FIG. 10, a protuberance may be movable in order to be capable of being retracted into the structure 20.

The protuberance 40 is thus attached to the structure 20 by a fastener system 60.

The fastener system 60 includes movement means 61, such as an electric motor or a hydraulic or pneumatic actuator.

In addition, the fastener system may include a processor unit 63. By way of example, the processor unit is provided with a non-volatile memory 64 and a processor 65. The processor unit may possibly include a microcontroller.

The processor unit 63 then communicates with the movement means 61.

Specifically, the processor unit may control the movement means:

either to position the protuberance in the position of FIG. 10, corresponding to an extended position POS0 in which the protuberance projects from the structure 20;

or else to position the protuberance in a retracted position (not shown) in which the protuberance does not project from the structure 20.

Furthermore, the processor unit may be connected to manually operable control means 75.

By way of example, the control means may enable an operator to position the protuberance in its retracted position or in its extended position. Such control means may comprise a selector having at least two positions, i.e. one position for causing the protuberance to be positioned in the retracted position, and another position for causing the protuberance to be positioned in the extended position. The control means may also cause the protuberance to be prevented from moving, or indeed cause the device to operate automatically.

In addition, the processor unit 63 may communicate with a measurement system 70 suitable for determining the current stage of flight.

The processor unit can then control the movement means automatically as a function of the current stage of flight. For example, the processor unit 63 may execute instructions stored in the non-volatile memory 64 in order to position the protuberance 40 automatically in the retracted position while on the ground and during a stage of sideways flight.

Figure 11:
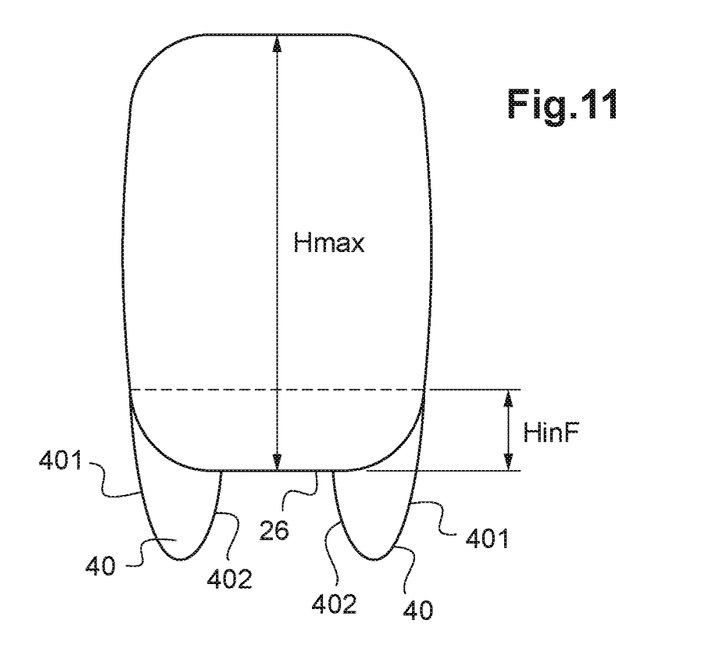
FIG. 11 is a diagram showing a tail boom with two protuberances.

With reference to FIG. 11, the tail boom may have two protuberances 40.

Each protuberance may have a surface referred to as its "external" surface 401 extending a flank of the structure, and a surface referred to as its "internal" surface 402 connected to the plane face 26 of the bottom.

The protuberances may optionally be arranged laterally on either side of the anteroposterior plane.

Independently of the invention, adding at least one protuberance, and in particular a single protuberance of the invention, serves to provide effective control over the air stream coming from a lift rotor and impacting the tail boom.

Figures 12, 13:
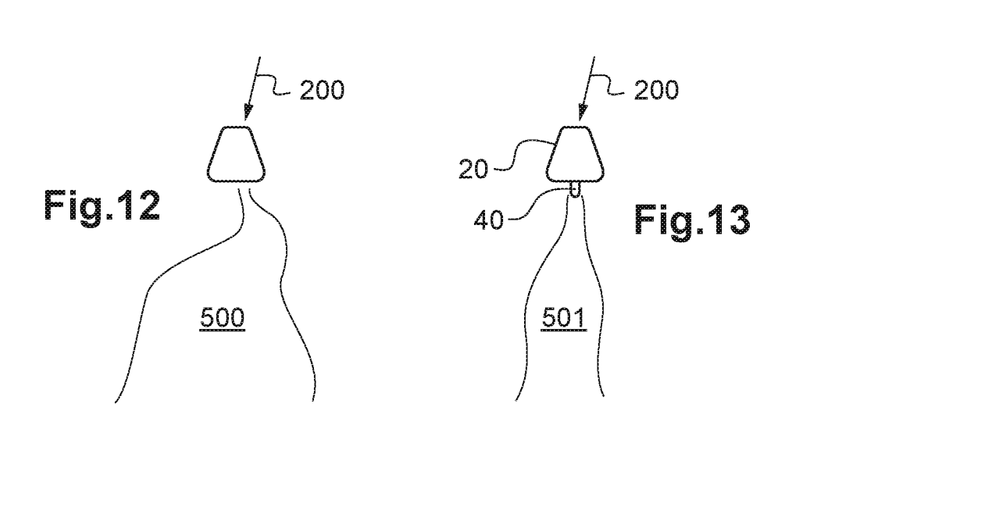
FIG. 12 is a diagram showing the wake of an air stream downstream from a prior art tail boom not provided with the invention.
FIG. 13 is a diagram showing the wake of an air stream downstream from a tail boom including the invention.

To illustrate this aspect, FIG. 12 shows an air stream 200 coming from a rotor. In addition, FIG. 12 shows the wake 500 of the air stream downstream from a tail boom of the prior art.

This wake 500 moves strongly from side to side downstream from the tail boom. Furthermore, the wake 500 is of large intensity and size.

Conversely, FIG. 13 shows the wake 501 of an air stream downstream from a tail boom including the invention.

Each protuberance serves to limit the phenomenon of the air stream flapping downstream from the tail boom and tends to reduce the intensity and size of the wake 501 of the air stream downstream from the tail boom.

Naturally, the present invention may be subjected to numerous variants as to its implementation. Although several embodiments are described, it will readily be understood that it is not conceivable to identify exhaustively all possible embodiments. It is naturally possible to envisage replacing any of the means described by equivalent means without going beyond the ambit of the present invention.

Although the description of the figures refers to one protuberance, the characteristics described may apply to a plurality of protuberances in the context of a tail boom presenting at least two protuberances. The protuberances on a given tail boom may also possess characteristics that are identical, or characteristics that vary from one protuberance to another.

The invention claimed is:

1. A tail boom for an aircraft having a central airframe carrying at least one lift rotor, the tail boom carrying a secondary motor and comprising:

an elongate structure adapted to carry the secondary rotor and extending from the central airframe in a longitudinal direction (X) over a "length" distance along an anteroposterior plane of symmetry of the elongate structure, the elongate structure extending downwards from a top towards a bottom having a plane surface;

at least one protuberance, extending downward from the plane surface of the bottom in order to reduce the loss of negative lift of the tail boom, the protuberance being secured to the structure and extending under the structure in the longitudinal direction (X), no air passage lying between the protuberance and the structure, a section of the tail boom contained in a vertical plane orthogonal to the longitudinal direction (X) presenting:

a shape of the structure referred to as a "main" shape that extends in elevation downwards from the top to the bottom over a distance that reaches a maximum referred to as the "maximum height" (Hmax), and extending laterally from a second flank to a first flank over a distance that reaches a maximum referred to as the "maximum thickness" (EPmax); and a shape of the protuberance referred to as an "extension" shape being contiguous with a bottom zone of the structure, the bottom zone extending upwards in elevation from the plane surface over a height referred to as the "bottom" height (Hinf) that is less than 15% of the maximum height (Hmax), the extension shape extending downwards in elevation over a distance reaching a maximum referred to as the "extension height" (Hext) and laterally over a distance reaching a maximum referred to as the "extension thickness" (EPext), the extension height (Hext) in the range of 0.05 to 0.5 times the maximum thickness (EPmax) of the section, the extension thickness (EPext) less than or equal to 0.4 times the maximum thickness (EPmax) of the section, wherein the extension height of the at least one protuberance varies along the length of the structure.

2. The tail boom according to claim 1, wherein the main shape has a relative thickness greater than or equal to 0.5, the relative thickness being the quotient of the maximum thickness (EPmax) divided by the maximum height (Hmax).

3. The tail boom according to claim 1, wherein the at least one protuberance is secure with the structure, the structure and the protuberance forming part of a common structural shell.

4. The tail boom according to claim 1, wherein the at least one protuberance is connected to the structure by a fastener system, the fastener system comprising elevation movement means for masking the protuberance on request inside the structure in a "retracted" position and for extending the protuberance on request outside the structure in an "extended" position (POS0), the protuberance projecting from the structure over a height equal to the extension height (Hext) when in the extended position (POS0).

5. The tail boom according to claim 4, wherein the fastener system includes a processor unit connected to a measurement system for determining a stage of flight, the processor unit executing instructions stored in a non-volatile memory for automatically positioning the protuberance in the retracted position when on the ground and during a stage of sideways flight.

6. The tail boom according to claim 4, wherein the fastener system includes control means for causing the protuberance to move under manual control.

7. The tail boom according to claim 1, wherein the at least one protuberance laterally forms at least one of a Gaussian curve, a triangle, a rectangle or a sinusoid in each of its sections.

8. The tail boom according to claim 1, wherein the extension height (Hext) is in the range of 0.05 to 0.1 times the maximum thickness (EPmax).

9. The tail boom according to claim 1, wherein the tail boom has two protuberances, each protuberance including an "external" surface extending the flanks of the structure and an "internal" surface connected to the plane surface.

10. The tail boom according to claim 1, wherein the tail boom includes two protuberances, the protuberances being arranged laterally facing each other and on either side of the anteroposterior plane.

11. An aircraft having a central airframe carrying at least one lift rotor carrying a plurality of blades, the aircraft having a tail boom according to claim 1 extending along an anteroposterior plane and carrying a secondary rotor different from the lift rotor.

12. The aircraft according to claim 11, wherein the anteroposterior plane lying transversely between a first side and a second side of the aircraft, each blade being in an "advancing" blade position when the blade is moving on the first side and being in a "retreating" blade position when the blade is moving on the second side, the at least one protuberance being situated on the first side.

13. The aircraft according to claim 11, wherein the anteroposterior plane lying transversely between a first side and a second side of the aircraft, each blade being in an "advancing" blade position when the blade is moving on the first side and being in a "retreating" blade position when the blade is moving on the second side, for each section the protuberance is arranged on either the first side or second side of the anteroposterior plane of symmetry, wherein the protuberance is spaced apart laterally from the first side by a spacing distance in the range of 0.15 to 0.85 times the maximum thickness (EPmax).

14. A tail boom for an aircraft having a central airframe having least one lift rotor, the tail boom comprising:

an elongate tail structure adapted to carry a tail rotor and extending from the central airframe in a longitudinal direction over a length distance and symmetric about an anteroposterior plane, the elongate tail structure having a maximum height extending from a top surface to a bottom surface and having a maximum thickness extending laterally from a first flank to a second flank; and a protuberance protruding downward from the elongate tail structure and shaped to reduce the loss of negative lift of the tail the protuberance extending from the bottom of the elongate tail structure at an extension height and protuberance extending extend laterally an extension thickness, the extension height in the range of 0.05 to 0.5 times the maximum thickness of the elongate tail structure, and the extension thickness is less than or equal to 0.4 times the maximum thickness of the elongate tail structure, where the extension height varies along the length distance of the elongate tail structure.

15. The tail boom according to claim 14, wherein the elongate tail structure has a relative thickness greater than or equal to 0.5, wherein the relative thickness is the quotient of the maximum thickness of the elongate tail structure divided by the maximum height of the structure.

16. The tail boom according to claim 14, wherein the protuberance laterally forms of at least one of a Gaussian curve, a triangle, a rectangle or a sinusoid.

17. The tail boom according to claim 14, wherein the bottom surface has a plane surface and the protuberance protrudes downward from the plane surface.

18. An aircraft having a central airframe carrying at least one lift rotor with a plurality of blades, and a tail boom according to claim 14 extending from the central airframe and carrying a tail rotor.

19. The aircraft according to claim 18, wherein the anteroposterior plane extends between a first side and a second side of the aircraft, each blade being in an advancing blade position when the blade is moving on the first side and being in a retreating blade position when the blade is moving on the second side, wherein the protuberance is positioned on the first side.

20. The aircraft according to claim 18, wherein the anteroposterior plane extends between a first side and a second side of the aircraft, each blade being in an advancing blade position when the blade is moving on the first side and being in a retreating blade position when the blade is moving on the second side, the protuberance is arranged on either side of the anteroposterior plane of symmetry.

* * * * *